United States Patent
Zhao et al.

(10) Patent No.: US 9,952,332 B2
(45) Date of Patent: Apr. 24, 2018

(54) METHOD AND PET APPARATUS

(71) Applicant: Shenyang Neusoft Medical Systems Co., Ltd., Shenyang (CN)

(72) Inventors: Yuqiu Zhao, Shenyang (CN); Guodong Liang, Shenyang (CN); Long Yang, Shenyang (CN); Peng Gao, Shenyang (CN); Gai Cui, Shenyang (CN)

(73) Assignee: SHENYANG NEUSOFT MEDICAL SYSTEMS CO., LTD., Shenyang (CN)

( * ) Notice: Subject to any disclaimer, the term of this patent is extended or adjusted under 35 U.S.C. 154(b) by 0 days.

(21) Appl. No.: 15/347,758

(22) Filed: Nov. 9, 2016

(65) Prior Publication Data
US 2017/0160408 A1    Jun. 8, 2017

(30) Foreign Application Priority Data
Dec. 8, 2015   (CN) .......................... 2015 1 0897326

(51) Int. Cl.
| | | |
|---|---|---|
| G01T 1/16 | (2006.01) | |
| G01T 1/164 | (2006.01) | |
| G01T 1/20 | (2006.01) | |
| G01T 1/208 | (2006.01) | |

(52) U.S. Cl.
CPC ............ *G01T 1/1648* (2013.01); *G01T 1/208* (2013.01); *G01T 1/2018* (2013.01)

(58) Field of Classification Search
CPC ................. G01M 11/005; G01N 21/55; G01N 2201/06113; G01N 2201/0697
USPC ..................................................... 250/370.08
See application file for complete search history.

(56) References Cited

U.S. PATENT DOCUMENTS

| | | |
|---|---|---|
| 2003/0057375 A1 | 3/2003 | Williams |
| 2010/0065746 A1 | 3/2010 | Grazioso et al. |
| 2010/0090763 A1* | 4/2010 | Benhamouda ........... H03G 7/08 330/86 |

(Continued)

FOREIGN PATENT DOCUMENTS

| | | |
|---|---|---|
| CN | 101292174 A | 10/2008 |
| CN | 103777226 A1 | 5/2014 |

(Continued)

*Primary Examiner* — David Porta
*Assistant Examiner* — Gisselle Gutierrez
(74) *Attorney, Agent, or Firm* — Kilpatrick Townsend & Stockton LLP

(57) ABSTRACT

A method and a PET apparatus are provided. According to an example of the method, a saturation indicia of a target detector may be determined through simulating emission of a γ photon to the target detector. The target detector is any one of SiPM detectors of a PET apparatus. The saturation indicia is for designating a maximum output voltage after amplifying an output of the target detector through a VGA when one γ photon is received by the target detector. The target VGA is a VGA corresponding to the target detector. By comparing an output voltage of the target VGA and the saturation indicia, it may determine that the target detector received a saturation event if the output voltage of the target VGA is higher than the saturation indicia. An amplifier gain of the target VGA may be adjusted until an amount of the saturation events detected by the target detector in unit time satisfies a pre-determined threshold.

12 Claims, 3 Drawing Sheets

(56) References Cited

U.S. PATENT DOCUMENTS

2013/0009047 A1    1/2013   Grazioso et al.
2013/0327932 A1   12/2013   Kim et al.
2014/0110573 A1    4/2014   Wang et al.
2015/0168567 A1    6/2015   Kim et al.
2015/0177394 A1    6/2015   Dolinsky et al.

FOREIGN PATENT DOCUMENTS

| CN | 104107061 A | 10/2014 |
| CN | 104597474 A | 5/2015 |
| CN | 105030263 A | 11/2015 |
| JP | 08-304551 A | 11/1996 |
| JP | 2002508505 A | 3/2002 |
| WO | 2006111883 A2 | 10/2006 |
| WO | 2014077717 A1 | 5/2014 |

\* cited by examiner

METHOD AND PET APPARATUS

BACKGROUND

Positron Emission Computed Tomography (PET) technology is a nuclear medical clinical imaging technology. A positron emitted from radionuclides injected into an intro-subject (a human body as an example in the followings) is combined with a negatron within the human body to generate annihilation radiation after movement of nearly 1 mm to produce two γ photons with the same energy but in opposite directions. A PET apparatus detects the γ photons through a detector including crystal arrays. When the γ photons touches crystals of the crystal arrays during the movement of the γ photons, the touched crystals can sense energy data of the γ photons. Since a low energy captured by the detector, an energy spectrum of lesion may be attained through amplifying the energy and processing the amplified energy. The energy detected by the detector is generally amplified through a Variable Gain Adjust (VGA) apparatus connected with the detector. The higher an amplified gain of the VGA apparatus, corresponding magnification of the energy is increased.

Currently, a new type of photomultiplier, which is Silicon photomultiplier (SiPM), is constituted of hundreds to tens of thousands of cell arrays of avalanche photo diode (APD) with a diameter of several to several tens of micrometers and integrated on a single silicon wafer. As a very small size of SiPM, one SiPM may be connected with one crystal to form a SiPM detector having 1:1 configuration. The SiPM in this configuration may detect single γ photon through one crystal thereof, and since generally the SiPM detector has one crystal, location of the crystal receiving the γ photon may be determined once the energy data are detected by the SiPM detector. Thus, SiPM is capable of applying in the PET apparatus as a detector thereof.

SUMMARY

In accordance with one aspect of the present disclosure, a method is provided. The method includes determining a saturation indicia of a target detector through simulating emitting a γ photon to the target detector. The target detector is any one of a plurality of silicon photomultiplier tube (SiPM) detectors of a PET apparatus. The saturation indicia is for designating a maximum output voltage after amplifying an output of the target detector through a target variable gain amplifier (VGA) coupled to the target detector when one γ photon is received by the target detector. The method further includes comparing an output voltage of the target VGA and the saturation indicia; determining the target detector received a saturation event under the condition that the output voltage of the target VGA is higher than the saturation indicia; and adjusting an amplifier gain of the target VGA until an amount of the saturation events detected by the target detector in unit time ua pre-determined threshold.

In accordance with another aspect of the present disclosure, a positron emission tomography-computed tomography (PET) apparatus is provided. The PET apparatus includes a plurality of silicon photomultiplier tube (SiPM) detectors, and a processor. The processor is for determining a saturation indicia of a target detector through simulating emitting a γ photon to the target detector. The target detector is any one of a plurality of silicon photomultiplier tube (SiPM) detectors of a PET apparatus. The saturation indicia is for designating a maximum output voltage after amplifying an output of the target detector through a target variable gain amplifier (VGA) coupled to the target detector when one γ photon is received by the target detector. The processor is for comparing an output voltage of the target VGA and the saturation indicia, determining the target detector received a saturation event under the condition that the output voltage of the target VGA is higher than the saturation indicia, and adjusting an amplifier gain of the target VGA until an amount of the saturation events detected by the target detector in unit time satisfies a pre-determined threshold.

BRIEF DESCRIPTION OF DRAWINGS

The details of one or more embodiments of the subject matter described in the present disclosure are set forth in the accompanying drawings and description below. Other features, aspects, and advantages of the subject matter will become apparent from the description, the drawings, and the claims. Features of the present disclosure are illustrated by way of example and not limited in the following figures, in which like numerals indicate like elements.

DETAILED DESCRIPTION

Figure 1:
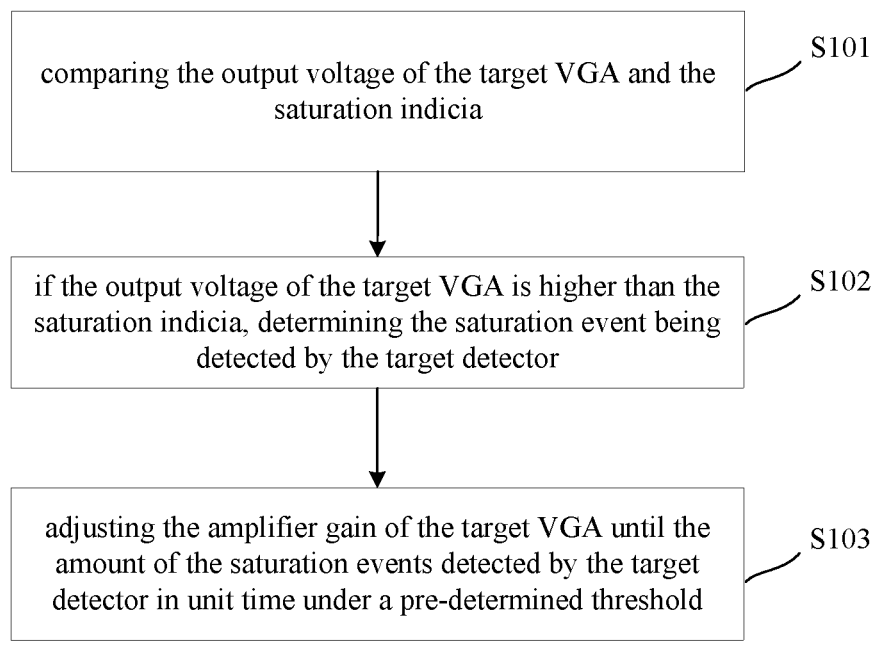
FIG. 1 is a schematic flow diagram of a method in accordance with an embodiment.

A PET apparatus detects a γ photon produced in positron annihilation through a detector and determines a crystal location of a crystal receiving the γ photon. Currently, when determining the crystal location, a traditional centroid method may be used for energy capture, for example, a discretized positioning circuit (DPC) or a symmetric charge division circuit (SCD) may be utilized for energy capture by the centroid method, and the crystal location may be calculated according to a relationship between the captured energy and position coordinates. However, this method has many defects, such as determining the location is sometimes not easy.

A small size of SiPM allows one SiPM connecting to one crystal to form a SiPM detector of a 1:1 configuration, and the crystal location of the crystal receiving the γ photon is determined easily and rapidly due to the configuration. The crystal location is determined to be a location of the crystal connected with this SiPM once the SiPM detector detects valid data, such that a variety of the defects of the centroid method may be avoided. However, currently there isn't a valid way to apply actually the SiPM detector in the PET apparatus. For example, if the SiPM detector of the 1:1 configuration is applied in the PET apparatus, not only the crystal location of the crystal receiving of the γ photon should be determined, but also it should be considered that how to determine whether detected data are valid or invalid. Accordingly, a method is provided in the present disclosure to ensure implementation of a PET system employing the above-mentioned SiPM detector of the 1:1 configuration.

Prior to describing a technical solution provided by the present disclosure, concepts of the saturation event, the valid event and the scattering event, which will be mentioned in various embodiments, will be described firstly.

Two γ photons generated in annihilation of one positron move in opposite directions generally, but sometimes the γ photon(s) is scattered and offsets from the original moving direction or interferences such as some noises may produce certain energy input. Therefore there is a need to determine which energy data are valid and which energy data are invalid during the detector of the PET apparatus detecting the γ photons in the positron annihilation. The PET apparatus may include a Time of Flight (TOF)-PET apparatus.

The PET apparatus generally utilizes opposite positioned detectors to detect the γ photons produced in the positron annihilation. Since the two γ photons from one positron annihilation move in different paths in the human body, the γ photons reach two detectors at different time. If two γ photons positioned at 180 degrees to each other are determined to be detected by a detector system according to the crystal locations of the crystals receiving the γ photons in a determined time window, this event is referred to as a valid event and the corresponding energy data are valid data. Moreover, with respect to other angles determined according to the crystal locations of the crystals receiving the γ photons, a scattering event may also be distinguished, i.e. at least one of the detected two γ photons from the same positron annihilation offsets from the original direction after scattering before reaching the detector. The location information included in this scattering event is inaccurate, in other words, the data of the scattering event may be valid or invalid. If multiple γ photons are simultaneously received by one crystal, this crystal is designated in an energy saturation state and this event is referred to as a saturation event, of which the data are invalid.

FIG. 1 is a flow chart of a method in accordance with an embodiment, which may be applied in the PET apparatus including multiple SiPM detectors. A basis process is adjusting gains of the SiPM detectors of the PET apparatus to be substantially same or approximate. In an embodiment, the amplifier gains of VGAs separately connected with corresponding the SiPM detectors in the PET apparatus are adjusted. Specifically the amplifier gains of the VGAs connected with the corresponding SiPM detectors may be adjusted according to an amount of the saturation events in unit time.

Firstly, a saturation indicia designating one saturation event may be determined before executing this method, and the saturation event can be determined after determining the saturation indicia such that the saturation events may be counted subsequently. In the PET apparatus of the present disclosure, the SiPM detector of the 1:1 configuration includes one crystal and one corresponding SiPM connected to the crystal, and the SiPM detector is also connected to a corresponding VGA used for energy amplification. The saturation indicia is a maximum output voltage after amplifying an output of the SiPM detector by the corresponding VGA when one γ photon produced in the positron annihilation is received by the SiPM detector.

By means of simulating positron annihilation, an output voltage range of the VGA connected with the SiPM detector is determined when the γ photon hits the single crystal of the SiPM detector, and a maximum voltage is selected from the output voltage range as the saturation indicia. Since different crystals may capture different energy, each crystal needs to be simulated through the above-mentioned simulation. The maximum output voltages from the corresponding SiPMs and the corresponding VGAs connected to the crystals may be different for the different crystals, i.e. the saturation indicia of the different crystals may be different. When simulating the crystals individually, any one of the SiPM detectors may be regarded as a target detector, and the saturation indicia of the target detector is determined through simulating emitting the γ photon to the target detector. The saturation indicia is for designating a maximum output voltage after the output of the target detector is amplified by a target VGA when the γ photon is received by the target detector. The target VGA is a VGA coupled with the target detector.

In other words, the maximum energy produced by one γ photon in the target detector is simulated, and the output voltage of the target VGA is a maximum voltage under the condition of the target detector receiving one γ photon at this moment. A saturation event may be designated according to the saturation indicia. If the output voltage of the target VGA is higher than the saturation indicia, the target detector may receive multiple γ photons simultaneously and the event is a saturation event.

The flow chart of FIG. 1 illustrates how to count the saturation events for adjusting the VGA. The method in FIG. 1 illustrates adjusting the amplifier gain of one VGA coupled with one SiPM detector of the PET apparatus as an example, but the amplifier gain of other VGAs of the PET apparatus may be also adjusted in the method of FIG. 1.

At step S101, the output voltage of the target VGA is compared with the saturation indicia in the operation of the PET apparatus.

The operation of the PET apparatus may refer to a process of actual clinic use of the PET apparatus, or a process for debugging the PET apparatus. In operations of the PET apparatus, the target detector of the PET apparatus receives the γ photon from the positron annihilation under a non-simulated state, and the output voltage of the target detector is amplified by the target VGA to output an amplified output voltage.

At step S102, if the output voltage of the target VGA is higher than the saturation indicia, the saturation event is determined to be detected by the target detector.

For example, through the above simulation, it is clear that the voltage designated by the saturation indicia is a maximum voltage produced under the condition of the target detector receiving one γ photon. Thus, when the output voltage of the target VGA is higher than the saturation indicia, the saturation event occurs under the circumstances whenever the target detector receives two or more γ photons simultaneously or during an extreme short period of time, or the target detector is interfered by a signal. In this case, the PET apparatus may difficultly differentiate which part of the energy obtained by the target detector is produced by which one γ photon. Therefore, if the target detector detects the saturation event, the data produced by the target detector in the saturation event are invalid data.

At step S103, the amplifier gain of the target VGA is adjusted until the amount of the saturation events detected by the target detector in unit time satisfies a pre-determined threshold.

For example, whether the target detector detects the saturation event or not is determined by the process in step S102 and the number of saturation events detected by the target detector in unit time is counted. The unit time may not be less than a minimum amount of time needed for maintaining stability of proportion which may be a proportion between the number of the saturation events and the amount of total events. The proportion is unstable at the beginning of capture, but may be stable or fluctuate in a small range after capturing for a period of time. Since the proportion of the number of the saturation events detected by the target detector to the amount of the total events may be determined according to a sensitivity requirement under the normal operation of the PET apparatus, in other words, the pre-determined threshold may be determined according to the sensitivity requirement in advance. The amount of the total events may be the amounts of all events, such as a sum amount of the valid events, the scattering events and the saturation events, in unit time. Under high sensitivity requirement (more events can be detected under high sensitivity), the pre-determined threshold may even be set as 0, i.e. any saturation event does not occur in unit time. The pre-determined threshold may be a small value. For example, the value may be a designated amount set to be substantially equal to the amount of the saturation events detected by other SiPM detectors of the PET apparatus and in the acceptable sensitivity range, or the value may be a designated proportion which may be the proportion between the amount of the saturation events and the amount of the total events or a proportion between the amount of the saturation events and a sum amount of the valid event(s) and the scattering event(s). For example, the pre-determined thresholds for the SiPM detectors may be set to be substantially same in order to ensure the gains of the VGAs connected with the SiPMs of the PET apparatus are substantially same.

The manner of adjusting the amplifier gain of the target VGA is not limited. If the pre-determined threshold is a designated amount, when the amount of the saturation events detected by the target detector in unit time exceeds the pre-determined threshold, the amplifier gain of the target VGA is too high, so the amplifier gain of the target VGA may be down-regulated, and the target VGA decreases the amplifier times for amplifying the output of the target detector. After that, the amount of the saturation events detected by the target detector in unit time is decreased, which approximates the pre-determined threshold.

If the pre-determined threshold is the designated proportion, when the proportion corresponding to the amount of the saturation events detected by the target detector in unit time is lower than the pre-determined threshold, the amplifier gain of the target VGA may be too low, so the amplifier gain of the target VGA may be up-regulated, and the target VGA increases the amplifier times for amplifying the output of the target detector, thus the proportion corresponding to the amount of the saturation events detected by the target detector in unit time is increased, which approximates the pre-determined threshold.

The present disclosure also provides an alternative adjusting manner of the amplifier gain of the target VGA. When the saturation indicia is determined, the amplifier gain of the target VGA is adjusted to a maximum amount and data of the event are captured. If the target detector detects the saturation event, the amount of the saturation events detected by the target detector in unit time is counted. If the amount is higher than the pre-determined threshold, the amplifier gain of the target VGA is gradually decreased until the amount of the saturation events detected by the target detector in unit time is under (for example, lower or equal to) the pre-determined threshold so as to accomplish adjusting the amplifier gain of the target VGA.

It can be seen from the embodiment illustrated in FIG. 1:

In one aspect, since the particular 1:1 configuration of one SiPM connected with one crystal, a variety of defects of the centroid method may be avoided, and the location of the crystal receiving the γ photon may be determined easily and rapidly. And utilizing a large amount of ADs in the centroid method is avoided to save device cost and avoid determining difficultly the location of the photon caused by an error of capturing energy by an AD manner. The accurate location of the photon facilitates improvement of the image quality.

In another aspect, the saturation events detected by the target detector are determined through comparison between the output voltage of the target VGA and the saturation indicia, so as to not only eliminate the corresponding invalid data of the saturation events but also count the saturation events. The amplifier gain of the target VGA may be adjusted according to the amount of the saturation events to adjust the output voltage of the target VGA correspondingly. And the amount of the saturation events detected by the target detector in the unit time is adjusted to under the pre-determined threshold. Each SiPM detector of the PET apparatus may operate in the method to adjust the gains of the VGAs consistent to provide an essential basis of employing the SiPM detectors in the PET apparatus.

In another embodiment of the present disclosure, an event indicia is determined. The event is determined whether the valid event or a scattering event or not according to the output of the target VGA. The event indicia is set to allow the PET apparatus may further designate more event types, such as may designate whether the currently received event is the valid event or not.

Similarly, the event indicia may be set before distinguishing the event. The event indicia of the target detector is determined through simulating the γ photon emitting to the target detector. The event indicia is for designating a minimum output voltage when data of the event are designated as valid data and after amplifying the output of the target detector via the VGA when the γ photon is received by the target detector, in other words, the output voltage of the target VGA produced by a minimum energy when one γ photon, which is determined to be the valid event, hits the target detector. The event indicia is lower than the saturation indicia.

Figure 2:
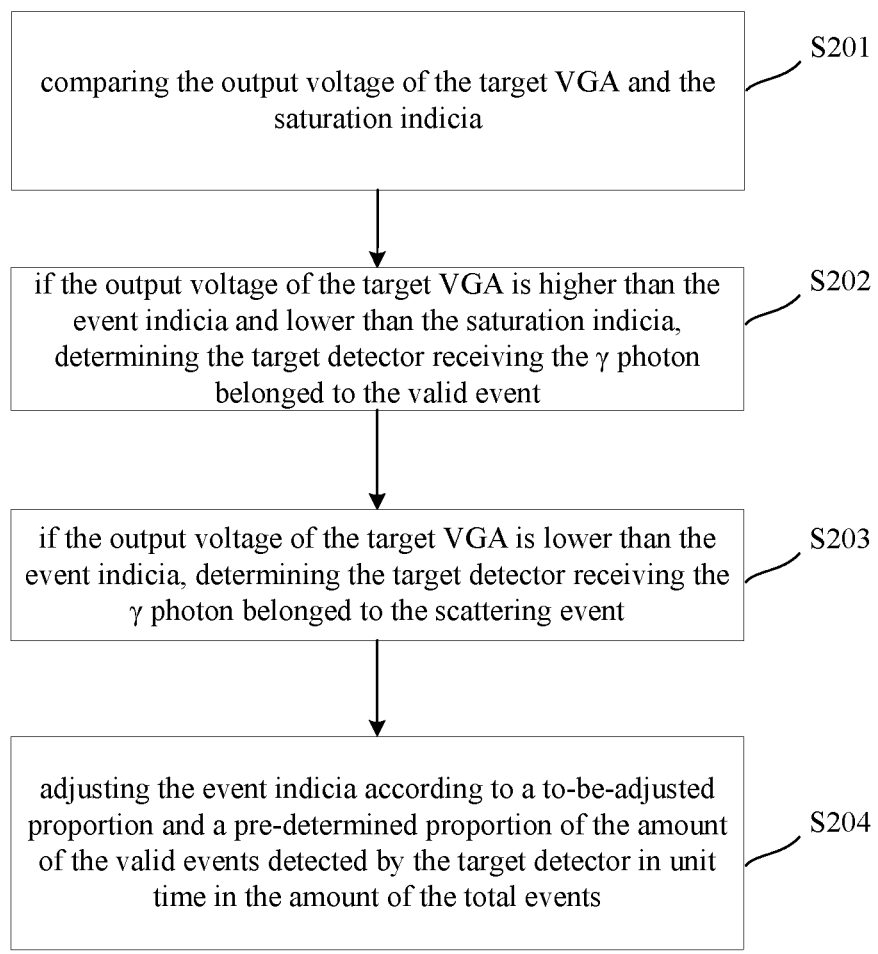
FIG. 2 is a schematic flow diagram of the method in accordance with another embodiment.

FIG. 2 is a schematic flow diagram of the method in accordance with another embodiment. The valid event and the scattering event may be distinguished through the method.

At step S201, the output voltage of the target VGA and the event indicia are compared.

At step S202, if the output voltage of the target VGA is higher than the event indicia and lower than the saturation indicia, the target detector is determined receiving the γ photon belonged to the valid event. The data of the valid event generated by the target detector are the valid data.

At step S203, if the output voltage of the target VGA is lower than the event indicia, the target detector is determined receiving the γ photon belonged to the scattering event. The data of the scattering event generated by the target detector are the valid data or the invalid data.

Figure 3:
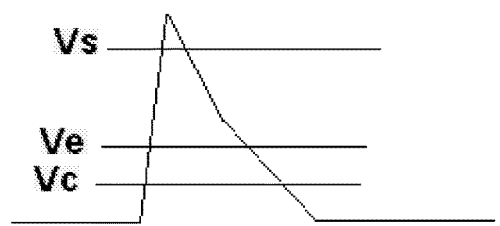
FIG. 3 is a curve diagram of a voltage in accordance with an embodiment.

FIG. 3 is a curve diagram of voltage in accordance with an embodiment. In FIG. 3, Vs is the saturation indicia, Ve is the event indicia, Vc is a time indicia. The vertical coordinate in FIG. 3 may be a voltage value, which becomes higher from the bottom to the top, and the horizontal coordinate may be the time, which is directed from the left to the right. The broken line in FIG. 3 may be considered to be the hopping of the output voltage of the target VGA. The output voltage of the target VGA remains typically lower than Vc before the target detector receiving the γ photon.

It can be seen from FIG. 3, the target detector may be considered to have detected the valid event when one hopping peak of the output voltage of the target VGA is between Vs and Ve. When one hopping peak of the output voltage of the target VGA is above Vs, the target detector may be considered to have detected the saturation event.

When one hopping peak of the output voltage of the target VGA is below Vs, the target detector may be considered to have detected the scattering event.

Referring to FIG. 2, at step S204, the event indicia is adjusted according to a to-be-adjusted proportion and a predetermined proportion of the amount of the valid events detected by the target detector in unit time in the amount of the total events to make the to-be-adjusted proportion is equal to the per-determined proportion.

It would be noted that the predetermined proportion of the amount of the valid events detected by a target detector in the amount of the total events may be determined according to the sensitivity requirement in the normal operation of the PET apparatus, in other words, the pre-determined proportion may be determined according to the sensitivity requirement in advance. For example, the predetermined proportion of the amount of the valid events in the amount of the total events in unit time may be 80% typically, i.e. a dense event area between the saturation indicia and the event indicia is available to designate the valid event. If the valid events are too many in unit time, the event indicia may be raised. If the valid events are too few in unit time, the event indicia may be lowered. Furthermore, the pre-determined proportion used by adjusting the event indicia of each SiPM detector in the PET apparatus may also remain consistent.

It can be seen that the type of the output data of the target detector, such as valid or invalid, may be determined validly through the output voltage of the target VGA by determining the event indicia. It provides a technical support to output a clear and accurate energy spectrum from the PET apparatus equipped with the SiPM detectors. It provides the implementation of the SiPM detectors in the PET apparatus with an essential basis. Moreover, in an embodiment, the proportion of the valid events in the total events is calculated according to the event indicia to adjust setting of the event indicia to ensure the dense event area between Vs and Ve, such that distinguishing the event type is more accurate; and, the scattering event is distinguished according to the event indicia to eliminate scattering instead of a traditional method of utilizing an energy value, such that the error from AD capturing energy is avoided and a rate of scattering elimination is greatly improved.

It would be noted that certain noises, such as dark noise, may be produced during the operation of the PET apparatus. These noises may influence the output of the detector, so the PET apparatus needs to distinguish validly from these noises in the output data and eliminate the influence. In another embodiment, the influence of such reasons like noise to the output data is distinguished according to the output voltage of the VGA.

A time indicia of the target detector is determined through simulating the γ photon emitting to the target detector. The time indicia is for designating a minimum output voltage after amplifying the output of the target detector via the target VGA when one γ photon is received by the target detector. The time indicia is lower than the saturation indicia and the event indicia. And the time indicia in an embodiment may be set to a minimum voltage indicia approximate a bottom-line to obtain the accurate time indicia.

The output voltage of the target VGA and the saturation indicia are compared in the operation of the PET apparatus.

If the output voltage of the target VGA is lower than the time indicia, the target detector is determined not to receive the γ photon and a time scaling signal is not produced.

Referring to FIG. 3, the target detector may be considered to have detected the scattering event when one hopping peak of the output voltage of the target VGA is between Ve and Vc. The target detector may be considered to not receive the γ photon and the output of the target detector is caused by the noise of the machine or other reasons when one hopping peak of the output voltage of the target VGA is below Vc. This portion of data may be removed to improve the accuracy of the energy spectrum for the essential basis of implementation of the SiPM detectors in the PET apparatus.

The output of a non-photon event caused by the machine noise or other reasons may be eliminated due to the time indicia, such that the dark noise is well removed for an effective inhibition of accumulation events so as to increase the counting rate. The time indicia may be selected based on a principle that the output voltage is higher than the amplitude of the dark noise.

As described above, the event type is distinguished through setting various indicia. For example, the saturation event may be distinguished according to the saturation indicia, the valid event and the scattering event may be distinguished according to the event indicia and whether receiving the γ photon or not may be distinguished according to the time indicia, so that whether the event data are valid or not is determined effectively.

Furthermore, whether the time scaling signal is generated or not and whether the time of each above event type is scaled or not may also be determined according to the time indicia. If the output voltage of the target VGA is higher than or equal to the time indicia Vc, the detected event may be the saturation event, the valid event or the scattering event, which may be time scaled for recording time. For example, if the target detector is determined to have detected the saturation event, the time scaling signal is generated to record the time of detecting the saturation event; if the target detector is determined to have received the γ photon belonged to the valid event, the time scaling signal is generated to record the time of detecting the valid event; if the target detector is determined to have received the γ photon belonged to the scattering event, the time scaling signal is generated to record the time of detecting the scattering event. While, if the output voltage of the target VGA is lower than the time indicia, the target detector is determined to have not received the γ photon and the time scaling signal is not generated.

A traditional time scaling apparatus may be utilized to determine the time indicia. One SiPM detector may use one time scaling apparatus separately for the best time scaling accuracy in an embodiment. In other words, alternatively, one time scaling apparatus is utilized to produce the time scaling signal for time scaling of the target detector. In another embodiment, a time scaling apparatus is commonly used to produce a time scaling signal for the time scaling of multiple SiPM detectors including the target detector. The time scaling apparatus may be a field-programmable gate array (FPGA) or a time to digital convert (TDC). The amount of the SiPM detectors share one time scaling apparatus should be considered since the more amount causing the higher probability of a lost event (i.e. an event is not detected).

In an embodiment, distinguishing of the event type is realized and the time and frequency of each event type may be counted. And as the particular 1:1 configuration of the SiPM detector, the location information of the event is not needed to be calculated later but directly determined. The recorded time, the corresponding event type including the saturation event and the location information may be uploaded to a backstage. The location information is utilized for generating the corresponding energy spectrum. The event type includes the saturation event, the valid event and the scattering event, and the location information and time information may be utilized for the subsequent compliance and the imaging process.

Furthermore, it can also be seen from above embodiments of the present disclosure that counting each type of the events may be utilized for adjusting the gain of the VGA and the corresponding values of the indicia. For example, the gain of the VGA may be adjusted according to the count of the saturation events to make the amount of the saturation event under the pre-determined threshold; or the event indicia may be adjusted according to distinguishing the valid event to make the area between the saturation indicia and the event indicia is the event dense area where the valid events are located. Adjusting the event indicia assists in allowing for more accuracy of the event type distinguished by the PET apparatus, and adjusting the amplifier gain of the VGA may ensure the consistency of the gains of the SiPM detectors in the PET apparatus.

Currently errors caused by noises or other factors may generally occur in the operation of the PET apparatus as the limitation of operation process and technology, so the amplifier gain of the VGA connected with the detector in the PET apparatus is typically needed to be adjusted, when under different conditions or detecting at each time, to generate the high quality energy spectrum. For example, after determining the time and the location information of each event type in the method of the present disclosure, in the next operation of the PET apparatus, the amplifier gain of the VGA is adjusted through counting the saturation events and Ve is adjusted through counting the proportion of the valid events in the total events in the method to make the PET apparatus to distinguish accurately.

Figure 4:
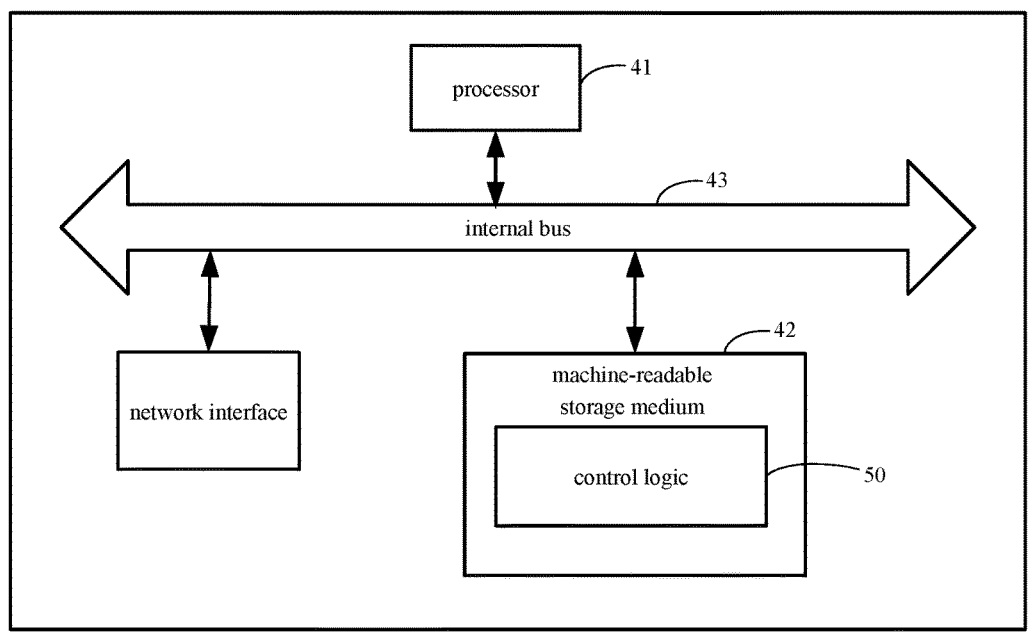
FIG. 4 is a hardware structural schematic diagram of a PET apparatus in accordance with an embodiment.
Figure 5:
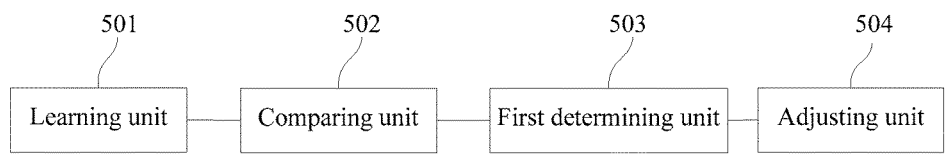
FIG. 5 is a function module diagram of control logic of the PET apparatus corresponding to the method of FIG. 1.

With reference to FIG. 4, a PET apparatus is also provided corresponding to the above method. In FIG. 4, the apparatus includes a processor 41 and a machine-readable medium 42. The processor 41 and the machine-readable medium 42 are connected by an internal bus 43. In an embodiment, the apparatus further includes an outer interface 44 for communication with other equipments or components.

In some embodiments, the machine-readable medium 42 may include one or more of a Radom Access Memory (RAM), a volatile memory, a non-volatile memory, a flash memory, a storage driver (such as hard disk driver), a solid state disk, any type of storage (such as optical disc, DVD etc.) or other like storage mediums, or any combination thereof.

Further, the machine-readable medium 42 stores a control logic 50 controlling PET system implementation, which may be referred to as a PET system implementation apparatus. The control logic 50 may functionally includes:

A learning unit 501 is for determine the saturation indicia of the target detector through simulating the γphoton emitting to the target detector, which is any one SiPM detector of the multiple SiPM detectors. The saturation indicia designates a maximum output voltage after amplifying the output of the target detector via the target VGA when one γ photon is received by the target detector. The target VGA is a VGA corresponding to the target detector.

A comparing unit 502 is for comparing the output voltage of the target VGA and the saturation indicia in the operation of the PET apparatus; if the output voltage of the target VGA is higher than the saturation indicia, a first determining unit 503 is triggered.

The first determining unit 503 is for determining the target detector having detected the saturation event.

An adjusting unit 504 is for adjusting the amplifier gain of the target VGA until the amount of the saturation events detected by the target detector in unit time under the pre-determined threshold.

In another embodiment, each unit of the present disclosure (such as, the comparing unit, the first determining unit, the adjusting unit etc.) may be realized through a logic unit in a hardware device, which may be such a programmable logic device such as a Field-Programmable Gate Array (FPGA), a Complex Programmable Logic Device (CPLD) etc. In an embodiment, the comparing unit and the first determining unit may be in a comparator and the adjusting unit may be in the FPGA and an upper computer. The output voltage of the target VGA and a gate indicia (for example, Vs, Ve etc.) are compared through the comparator to distinguish the event types (for example, distinguishing the saturation event); then, the event types distinguished by the comparator is counted by the FPGA, for example, counting the saturation events; next, the upper computer may compare the amount of the counted events and the pre-determined threshold (for example, comparing with a pre-determined times threshold of the saturation events in unit time) to determine how to adjust the amplifier gain of the VGA and control the adjustment of the amplifier gain of the VGA. In other embodiments, the threshold Ve may also be adjusted and the adjusted threshold Ve is set in the comparator for the comparator to distinguish the subsequent event type according to the adjusted threshold Ve.

Thus, the saturation indicia for the target detector is determined through the simulating process of emitting the γ photon to the target detector of the PET apparatus including multiple SiPM detectors. Accordingly, in the operation of the PET apparatus, since the particular 1:1 configuration of one SiPM connected with only one crystal, the step of determining particular crystal location in the current centroid method is omitted. The output voltage of the target VGA and the saturation indicia are compared. If the output voltage is higher than the saturation indicia, the target detector detects the saturation event, since the saturation indicia is a maximum voltage output from the target VGA when the target detector receives one γ photon. The data generated by the saturation event on the target detector are invalid data and are needed to be effectively removed. The output voltage of the target VGA may be adjusted correspondingly through adjusting the amplifier gain of the target VGA, such that the amount of the saturation events determined to be detected by the target detector in unit time is changed to under the pre-determined threshold. The amplifier gains of the VGAs may be effectively adjusted based on the amount of the saturation events detected in unit time to adjust the gains of the SiPMs consistent to provide the essential basis of the implementation of the SiPM in the PET apparatus.

An implementation may be exemplified by a software, which further describes how the PET apparatus executing the control logic 50. In an embodiment, the control logic 50 may be a computer order stored in the machine-readable medium 42. When the processor 41 executes the control logic 50, the processor 41, through calling the order of the control logic 50 stored in the machine-readable medium 42, executes operations as follows:

determining the saturation indicia of the target detector through simulating the γ photon emitting to the target detector which is any one SiPM detector of the multiple SiPM detectors. The saturation indicia designates a maximum output voltage after amplifying the output of the target detector through the target VGA when one γ photon is received by the target detector. The target VGA is a VGA corresponding to the target detector;

comparing the output voltage of the target VGA and the saturation indicia in the operation of the PET apparatus;

if the output voltage of the target VGA is higher than the saturation indicia, the saturation event is determined to have been detected by the target detector; and adjusting the amplifier gain of the target VGA until the amount of the saturation events detected by the target detector in unit time under the pre-determined threshold.

Further, through reading the machine-readable order, the processor may further execute the following operations:

determining the event indicia of the target detector through simulating the γ photon emitting to the target detector. The event indicia, which is lower than the saturation indicia, designates is the minimum output voltage identified as the valid data after amplifying the output of the target detector by the target VGA when one γ photon is received by the target detector;

comparing the output voltage of the target VGA and the event indicia in the operation of the PET apparatus;

if the output voltage of the target VGA is higher than the event indicia and lower than the saturation indicia, the target detector is determined to have received the γ photon belonged to the valid event, from which data generated on the target detector are the valid data;

if the output voltage of the target VGA is lower than the event indicia, the target detector is determined to receive the γ photon belonged to the scattering event, from which data generated on the target detector are the valid data or the invalid data;

adjusting the event indicia according to the to-be-adjusted proportion and the pre-determined proportion of the amount of the valid events detected by the target detector in unit time, to make the to-be-adjusted proportion is equal to the predefined proportion.

Further, through reading the machine-readable order, the processor may further execute the following operations:

determining the time indicia of the target detector through simulating the γ photon emitting to the target detector. The event indicia, which is lower than the saturation indicia, designates a minimum output voltage after amplifying the output of the target detector via the target VGA when one γ photon is received by the target detector. The method further includes:

comparing the output voltage of the target VGA and the time indicia in the operation of the PET apparatus;

if the output voltage of the target VGA is lower than the time indicia, the target detector is determined not to receive the γ photon and not to produce the time scaling signal.

Further, through reading the machine-readable order, the processor may further execute the following operations:

if the target detector is determined to detect the saturation event, the time scaling signal is generated to record the time of detecting the saturation event; if the γ photon belonged to the valid event is determined to be received by the target detector, the time scaling signal is generated to record the time of detecting the valid event; if the γ photon belonged to the scattering event is determined to be received by the target detector, the time scaling signal is generated to record the time of detecting the scattering event;

generating an energy spectrum according to the time scaling signal, the corresponding event type and the location information of the target detector. The event type may be the saturation event, the valid event or the scattering event.

Further, the time scaling apparatus is utilized to produce the time scaling signal for the time scaling of the target detector, or one time scaling apparatus is commonly used to produce the time scaling signal for the time scaling of the multiple SiPM detectors including the target detector.

It should be noted that in the present specification, various examples are described by using progressive way, the same part of which may be referred with each other and the highlighted description of each example is different from other examples. Especially for the equipment and system examples, the description is simple as it is similar with the method example, the corresponded reference may be made to the description of the method examples. The description of above equipment and system examples is only illustrative, wherein description of units as separated components may be divided physically or not, the display components as units may be physical units or not, which is located at one place or spread various network units. The purpose of the present solution may be realized by selecting the parts wherein or all the modules due to actual need. Those skilled in the art can apprehend and implement without creative work.

The above is only a better specific embodiment of the present disclosure, but the scope of the present invention is not limited to this, changes or replacements can be easily think by any skilled in the art in the art within the technical scope of the present disclosure disclosed without depart from the scope of protection of the present disclosure. Thus, the protection scope of the present disclosure should be in accordance with the claims.

The above are only preferred examples of the present disclosure is not intended to limit the disclosure within the spirit and principles of the present disclosure, any changes made, equivalent replacement, or improvement in the protection of the present disclosure should contain within the range.

The methods, processes and units described herein may be implemented by hardware (including hardware logic circuitry), software or firmware or a combination thereof The term 'processor' is to be interpreted broadly to include a processing unit, ASIC, logic unit, or programmable gate array etc. The processes, methods and functional units may all be performed by the one or more processors; reference in this disclosure or the claims to a 'processor' should thus be interpreted to mean 'one or more processors'.

Further, the processes, methods and functional units described in this disclosure may be implemented in the form of a computer software product. The computer software product is stored in a storage medium and comprises a plurality of instructions for making a processor to implement the methods recited in the examples of the present disclosure.

The figures are only illustrations of an example, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

Although the flowcharts described show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the present disclosure.

For simplicity and illustrative purposes, the present disclosure is described by referring mainly to an example thereof In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Throughout the present disclosure, the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method, comprising:
   determining a saturation indicia of a target detector through simulating emission of a γ photon to the target detector, the target detector being any one of a plurality of silicon photomultiplier tube (SiPM) detectors of a PET apparatus, the saturation indicia being for designating a maximum output voltage after amplifying an output of the target detector through a target variable gain amplifier (VGA) coupled to the target detector when one γ photon is received by the target detector;
   comparing an output voltage of the target VGA and the saturation indicia;
   determining the target detector received a saturation event under a condition that the output voltage of the target VGA is higher than the saturation indicia; and
   adjusting an amplifier gain of the target VGA until an amount of saturation events detected by the target detector in unit time satisfies a pre-determined threshold.

2. The method of claim 1, comprising:
   determining an event indicia of the target detector through the simulating, the event indicia being less than the saturation indicia and for designating a minimum output voltage when data of an event are designated as valid data and after amplifying the output of the target detector through the target VGA when one γ photon is received by the target detector;
   comparing the output voltage of the target VGA and the event indicia;
   determining the target detector receiving the γ photon belonged to a valid event under the condition that the output voltage of the target VGA is higher than the saturation indicia, data of the valid event generated by the target detector are valid data;
   determining the target detector receiving the γ photon belonged to a scattering event under the condition that the output voltage of the target VGA is lower than the event indicia, data of the scattering event generated by the target detector are valid data or invalid data; and
   adjusting the event indicia according to a to-be-adjusted proportion and a predetermined proportion of the amount of the valid events detected by the target detector to an amount of total events in unit time to make the to-be-adjusted proportion to be equal to the predetermined proportion, the amount of the total events being a sum amount of the valid events, the scattering events and the saturation events.

3. The method of claim 1, comprising:
   determining a time indicia of the target detector, the time indicia being less than the saturation indicia and for designating a minimum output voltage after amplifying the output of the target detector through the target VGA when one γ photon is received by the target detector;
   comparing the output voltage of the target VGA and the time indicia; and
   determining the target detector not receiving the γ photon and not producing a time scaling signal under the condition that the output voltage of the target VGA is lower than the time indicia.

4. The method of claim 2, comprising:
   determining a time indicia of the target detector, the time indicia being less than the event indicia and for designating the minimum output voltage after amplifying the output of the target detector through the target VGA when one γ photon is received by the target detector;
   comparing the output voltage of the target VGA and the time indicia; and
   determining the target detector not receiving the γ photon and not producing a time scaling signal under the condition that the output voltage of the target VGA is lower than the time indicia.

5. The method of claim 2, comprising,
   generating a time scaling signal to record the time of detecting the saturation event under the condition that the target detector is determined detecting the saturation event;
   generating the time scaling signal to record the time of detecting the valid event under the condition that one γ photon belonged to the valid event is determined to be received by the target detector;
   generating the time scaling signal to record the time of detecting the scattering event under the condition that one γ photon belonged to the scattering event is determined to be received by the target detector ; and
   generating an energy spectrum diagram according to the time scaling signal, a corresponding event type being the saturation event, the valid event or the scattering event, and corresponding location information of the target detector.

6. The method of claim 5, wherein generating the time scaling signal comprises generating, via a time scaling apparatus, the time scaling signal for time scaling of the target detector or the plurality of SiPM detectors including the target detector.

7. A positron emission tomography-computed tomography (PET) apparatus, comprising:
   a plurality of silicon photomultiplier tube (SiPM) detectors; and
   a processor, by reading and executing machine readable instructions stored in a storage medium, the processor is caused to:
   determine a saturation indicia of a target detector through simulating emitting a γ photon to the target detector, the target detector being any one of the plurality of silicon photomultiplier tube (SiPM) detectors of a PET apparatus, the saturation indicia for designating a maximum output voltage after amplifying an output of the target detector through a target variable gain amplifier (VGA) coupled to the target detector when one γ photon is received by the target detector;

compare an output voltage of the target VGA and the saturation indicia;

determine the target detector received a saturation event under a condition that the output voltage of the target VGA is higher than the saturation indicia; and adjust an amplifier gain of the target VGA until an saturation events detected by the target detector detected by the target detector in unit time satisfies a pre-determined threshold.

8. The PET apparatus of claim 7, wherein the machine readable instructions further cause the processor to:

determine an event indicia of the target detector through the simulating, the event indicia being less than the saturation indicia and for designating a minimum output voltage when data of an event are designated as valid data and after amplifying the output of the target detector through the target VGA when one γ photon is received by the target detector;

compare the output voltage of the target VGA and the event indicia;

determine the target detector receiving the γ photon belonged to a valid event under the condition that the output voltage of the target VGA is higher than the saturation indicia, data of the valid event generated by the target detector are valid data;

determine the target detector receiving the γ photon belonged to a scattering event under the condition that the output voltage of the target VGA is lower than the event indicia, data of the scattering event generated by the target detector are valid data or invalid data; and adjust the event indicia according to a to-be-adjusted proportion and a predetermined proportion of the amount of the valid events detected by the target detector to an amount of total events in unit time to make the to-be-adjusted proportion to be equal to the predetermined proportion, the amount of the total events being a sum amount of the valid events, the scattering events and the saturation events.

9. The PET apparatus of claim 7, wherein the machine readable instructions further cause the processor to:

determine a time indicia of the target detector, the time indicia being less than the saturation indicia and for designating a minimum output voltage after amplifying the output of the target detector through the target VGA when one γ photon is received by the target detector;

compare the output voltage of the target VGA and the time indicia; and determine the target detector not receiving the γ photon and not producing a time scaling signal under the condition that the output voltage of the target VGA is lower than the time indicia.

10. The PET apparatus of claim 8, wherein the machine readable instructions further cause the processor to:

determine a time indicia of the target detector, the time indicia being less than the event indicia and for designating the minimum output voltage after amplifying the output of the target detector through the target VGA when one γ photon is received by the target detector;

compare the output voltage of the target VGA and the time indicia; and determine the target detector not receiving the γ photon and not producing a time scaling signal under the condition that the output voltage of the target VGA is lower than the time indicia.

11. The PET apparatus of claim 8, wherein the machine readable instructions further cause the processor to:

generate a time scaling signal to record the time of detecting the saturation event under the condition that the target detector is determined to be detecting the saturation event;

generate the time scaling signal to record the time of detecting the valid event under the condition that one γ photon belonged to a valid event is determined to be received by the target detector;

generate the time scaling signal to record the time of detecting the scattering event under the condition that one γ photon belonged to the scattering event is determined to be received by the target detector; and generate an energy spectrum diagram according to the time scaling signal, a corresponding event type being the saturation event, the valid event or the scattering event, and corresponding location information of the target detector.

12. The PET apparatus of claim 11, comprising a time scaling apparatus for generating the time scaling signal for time scaling of the target detector or the plurality of SiPM detectors including the target detector.

* * * * *